US008891489B2

(12) United States Patent
Attar et al.

(10) Patent No.: US 8,891,489 B2
(45) Date of Patent: Nov. 18, 2014

(54) HANDOVER MECHANISM THAT EXPLOITS UPLINK CHANNEL QUALITY OF A TARGET CELL

(75) Inventors: Rashid Ahmed Akbar Attar, San Diego, CA (US); Aleksandar Damnjanovic, Del Mar, CA (US); Durga Prasad Malladi, San Diego, CA (US); Francesco Grilli, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1195 days.

(21) Appl. No.: 12/049,867

(22) Filed: Mar. 17, 2008

(65) Prior Publication Data
US 2009/0028112 A1    Jan. 29, 2009

Related U.S. Application Data

(60) Provisional application No. 60/895,585, filed on Mar. 19, 2007, provisional application No. 60/940,967, filed on May 30, 2007.

(51) Int. Cl.
H04W 4/00 (2009.01)
H04W 36/30 (2009.01)

(52) U.S. Cl.
CPC ................... H04W 36/30 (2013.01)
USPC ........................ 370/332; 455/438

(58) Field of Classification Search
None
See application file for complete search history.

(56) References Cited

U.S. PATENT DOCUMENTS

| 5,832,368 | A | 11/1998 | Nakano et al. |
| 6,438,377 | B1 | 8/2002 | Savolainen |
| 7,072,315 | B1 | 7/2006 | Liu et al. |
| 7,206,580 | B2 | 4/2007 | Black |
| 2005/0169301 | A1* | 8/2005 | Jain et al. ............. 370/464 |
| 2005/0288027 | A1* | 12/2005 | Cho et al. ............. 455/442 |

(Continued)

FOREIGN PATENT DOCUMENTS

| CN | 1330849 A | 1/2002 |
| JP | 9224276 A | 8/1997 |

(Continued)

OTHER PUBLICATIONS

"LTE Handover procedures" 3rd Generation Partnership Project (3GPP); Technicalspecification Group (TSG) Radio Access Network (RAN): Workinggroup 3 (WG3). vol. R2-060951, Feb. 13, 2006, pp. 1-9, XP003012347.

(Continued)

*Primary Examiner* — Mohammad Adhami
(74) *Attorney, Agent, or Firm* — Liem T. Do

(57) ABSTRACT

System(s) and method(s) are provided for handover of a mobile terminal in a wireless communication system. Handoff resolution relies on both a downlink channel quality indication between a serving base station and the mobile terminal, and uplink channel quality indications amongst the terminal and a measurement set of target base stations. To generate UL channel quality indicators, the mobile station conveys a narrowband or broadband, sounding reference signal, and serving and target base stations measure UL and DL performance metrics (e.g., RSRP, RSSI, or RSOT). In backward handover, UL channel state information from target cells is received at the serving base station through backhaul communication, and handoff is resolved based on both UL and DL quality reports. In forward handover, the set of UL quality reports are conveyed to the mobile station to determine a target cell for handoff.

31 Claims, 13 Drawing Sheets

(56) References Cited

U.S. PATENT DOCUMENTS

| | | | |
|---|---|---|---|
| 2006/0281461 A1* | 12/2006 | Kwun et al. | 455/436 |
| 2007/0015511 A1* | 1/2007 | Kwun et al. | 455/436 |
| 2007/0155391 A1* | 7/2007 | Kang et al. | 455/450 |
| 2007/0213065 A1* | 9/2007 | Kang et al. | 455/442 |
| 2008/0039098 A1* | 2/2008 | Papasakellariou et al. | 455/442 |
| 2008/0107075 A1* | 5/2008 | Ramachandran et al. | 370/331 |
| 2008/0188260 A1* | 8/2008 | Xiao et al. | 455/522 |
| 2009/0186616 A1* | 7/2009 | Kim et al. | 455/436 |
| 2009/0275337 A1* | 11/2009 | Maeda et al. | 455/442 |

FOREIGN PATENT DOCUMENTS

| | | |
|---|---|---|
| JP | 2002534027 A | 10/2002 |
| JP | 2003503922 A | 1/2003 |
| WO | WO0038463 A2 | 6/2000 |
| WO | 0101720 | 1/2001 |
| WO | WO 01/01720 A1 * | 1/2001 |
| WO | 2005006781 A2 | 1/2005 |

OTHER PUBLICATIONS

Texas Instruments: "Multiplexing of Distributed (?Sounding?) Reference Signals for CQI Measurements and Scheduling in Eutra Uplink" 3GPP TSG RAN WG2, Tallin, Estonia, Sep. 1, 2006, XP002501286.

International Search Report—PCT/US08/057560—International Search Authority—European Patent Office—Oct. 27, 2008.

Written Opinion—PCT/US08/057560—International Search Authority—European Patent Office—Oct. 27, 2008.

Taiwan Search Report—TW097109751—TIPO—Sep. 20, 2011.

* cited by examiner

272
UPLINK MEASUREMENTS

BROADAND OR NARROWBAND SOUNDING REFERENCE SIGNAL REFERENCE POWER (RSRP)

BROADAND OR NARROWBAND SOUNDING REFERENCE SIGNAL STRENGTH INDICATOR (RSSI)

BROADAND OR NARROWBAND SOUNDING REFERENCE SIGNAL OVER THERMAL NOISE (RSOT)

274
DOWNLINK MEASUREMENTS

REFERENCE SIGNAL REFERENCE POWER

REFERENCE SIGNAL STRENGTH INDICATOR

276
COMMUNICATION INDICATORS

SYSTEM BANDWIDTH

PILOT SEQUENCES

CQI REPORTING DIRECTIVES

CELL DOWNLINK (DL) TIMING

CELL SPECIFIC UPLINK TIMING OFFSET RELATIVE TO DL

FIG. 2B

HANDOVER MECHANISM THAT EXPLOITS UPLINK CHANNEL QUALITY OF A TARGET CELL

CLAIM OF PRIORITY UNDER 35 U.S.C. §119

This Application for Patent claims the benefit of U.S. Provisional Application Ser. No. 60/895,585 filed on Mar. 19, 2007, and entitled "INTRA-RAT Handover Using Target Cell UL Channel Quality for LTE," and U.S. Provisional Application Ser. No. 60/940,967 filed on May 30, 2007, and entitled "A METHOD AND APPARATUS FOR HANDOVER BASED ON UL MEASUREMENT." The entirety of these applications is expressly incorporated herein by reference.

BACKGROUND

I. Field

The subject specification relates generally to wireless communications and, more particularly, to handover mechanism(s) for handover of a mobile terminal in a wireless communication system.

II. Background

Conventional technologies utilized for transmitting information within a mobile communication network (e.g., a cell phone network) include frequency, time and code division based techniques. In general, with frequency division based techniques calls are split based on a frequency access method, wherein respective calls are placed on a separate frequency. With time division based techniques, respective calls are assigned a certain portion of time on a designated frequency. With code division based techniques respective calls are associated with unique codes and spread over available frequencies. Respective technologies can accommodate multiple accesses by one or more users.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any tune in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

In the foregoing wireless communication systems, handover decisions are typically based on downlink (DL) channel quality metrics, for substantially any suitable metric, among the target base station and the access terminal to be handed-off. Such conventional approach to handoff resolution fails to incorporate uplink (UL) channel quality indications of the target cell. Yet, UL and DL in a typical wireless communication design may have substantially disparate characteristics, and therefore present an imbalance between a quality of UL and DL transmission and reception—generally referred to as link imbalance. In addition, disparate propagation environments for UL and DL signal may lead to further disparities in UL and DL channel quality. Therefore, handover decisions that rely only on a set of DL quality indications of a target base station may be inadequate, especially in cases where link quality imbalance is such that DL channel condition may be above a threshold for handoff, but UL channel conditions may be below such a threshold. There is therefore a need in the art for handover mechanism(s) that relies on both DL and UL channel quality.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

System(s) and method(s) are provided for handover of a mobile terminal in a wireless communication system. Handoff resolution relies on both a downlink channel quality indication between a serving base station and the mobile terminal, and uplink channel quality indications amongst the terminal and a measurement set of target base stations. To generate UL channel quality indicators, the mobile station conveys a narrowband or broadband sounding reference signal, and serving and target base stations measure UL and DL performance metrics (e.g., reference signal received power (RSRP), reference signal strength indicator (RSSI), or reference signal over thermal noise (RSOT)). In backward handover, UL channel state information from target cells is received at the serving base station through backhaul communication, and handoff is resolved based on both UL and DL quality reports. In forward handover, the set of UL quality reports are conveyed to the mobile station to determine a target cell for handoff.

In an aspect, a method for facilitating handover in wireless system is disclosed, the method comprising: receiving a set of uplink (UL) channel quality metrics through a backhaul communication interface; generating an UL-channel quality metric; receiving a set of downlink channel conditions; resolving handoff based at least in part on the received UL and DL channel quality indications.

In another aspect, the subject specification describes a wireless device, comprising: a processor configured to receive a set of uplink channel quality reports through a point-to-point backbone network communication; to receive a set of downlink channel condition indicators over a wireless link; to establish a handover based at least in part on the received UL channel quality reports and the DL channel condition indicators; and a memory coupled to the processor.

In yet another aspect, an apparatus that operates in a wireless environment is disclosed, the apparatus comprising: means for receiving a set of uplink (UL) channel quality metrics through a backhaul communication interface; means for generating an UL channel quality indication; means for receiving a set of downlink (DL) channel conditions; and means for resolving handoff based at least in part on the received UL channel quality metrics and the set of DL channel quality indications.

In a further yet aspect, the subject specification describes a computer program product comprising a computer-readable medium including: code for causing at least one computer to receive a set of uplink (UL) channel quality reports through a backhaul communication interface; code for causing at least one computer to generate an UL channel quality metric; receiving a set of downlink (DL) channel metrics; establishing a handover based at least in part on the set of UL channel quality reports and the set of DL channel metrics.

In an aspect, the subject specification describes a method for facilitating handover in wireless system, the method comprising: receiving an uplink (UL) channel quality metrics; retaining a handover fitness score associated with a source of the received UL channel quality metrics; establishing a handoff based at least in part on the received UL channel metrics and the retained channel quality metrics.

In another aspect, the subject specification discloses an apparatus that operates in a wireless environment, the apparatus comprising: a processor configured to receive a set of uplink (UL) channel quality indicators; to convey a sounding reference signal; to generate a set of downlink channel condition reports; to resolve a handover based at least in part on the received set of UL channel metrics; and a memory coupled to the processor.

In yet another aspect, a wireless device is disclosed, the device comprising: means for receiving an uplink (UL) channel metric; means for determining a set of downlink (DL) channel conditions; means for retaining a handover fitness score associated with a source of the received UL channel metric; means for establishing a handoff based at least in part on the received UL channel metric; and means for resolving a handover based at least in part on the received UL channel metric and the retained handover fitness score.

In a further aspect, the subject specification discloses a computer program product comprising a computer readable medium including: code for causing at least one computer to receive an uplink (UL) channel metric; code for causing the least one computer to retain a handover fitness score associated with, a source of the received UL channel metric; code for causing the at least one computer to determine a handoff based at least in part; on the received UL channel metric; and code for causing the at least one computer to resolve a handover based at least in part on the received UL channel metric and the retained handover fitness score.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIGS. 2A, 2B, and 2C are, respectively, a block diagram of an example system that facilitates handover based on UL and DL channel conditions according to aspects described in the subject specification; diagrams of UL and DL measurements, and communication indicators conveyed during operation of the system in FIG. 2A; and a block diagram of an example system that facilitates handover based on UL and DL channel conditions.

DETAILED DESCRIPTION

Figure 1:
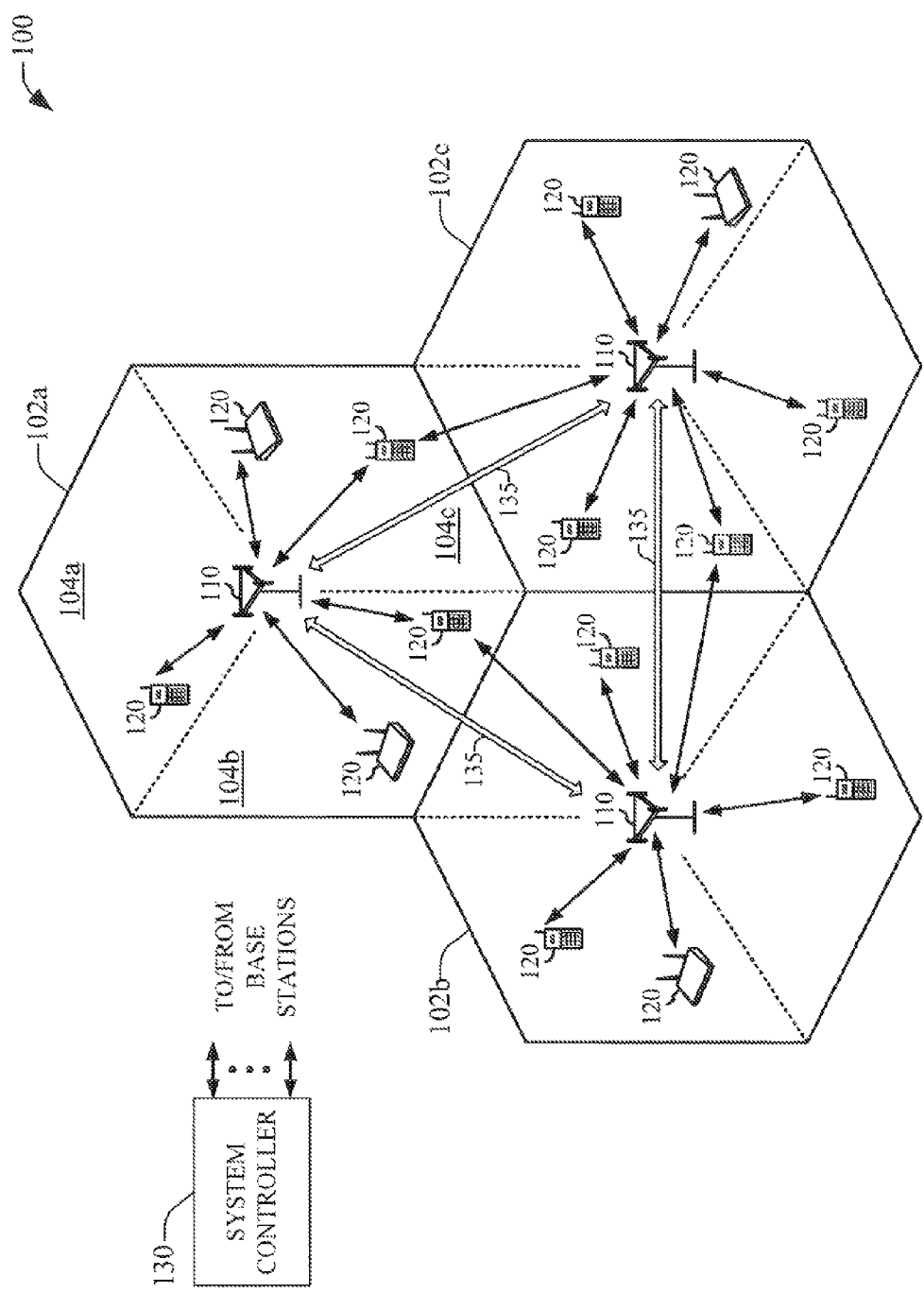
FIG. 1 illustrates an example wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process miming on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal a user terminal, a user agent, a user device, or a user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals, and with other base stations through backhaul network communication. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), or some other terminology.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102*a-e*. As used herein and generally in the art, the term "cell" can refer to a base station 110 and/or its coverage area 102*a-c* depending on the context in which the term is used.

To improve system capacity, the coverage area 102*a*, 102*b*, or 102*c* corresponding to a base station 110 can be partitioned into multiple smaller areas (e.g., areas 104*a*, 1.04*b*, and 104*c*). Each of the smaller areas 104*a*, 104*b*, and 104*c* can be served by a respective base transceiver subsystem (BTS, not shown). As used herein and generally in the art, the term "sector" can refer to a BTS and/or its coverage area depending on the context in which the term is used. In one example, sectors 104*a*, 104*b*, 104*c* in a cell 102*a*, 102*b*, 102*c* can be formed by groups of antennas (not shown) at base station 110, where each group of antennas is responsible for communication with terminals 120 in a portion of the cell 102*a*, 102*b*, or 102*c*. For example, a base station 310 serving cell 102*a* can have a first antenna group corresponding to sector 104*a*, a second antenna group corresponding to sector 104*b*, and a third antenna group corresponding to sector 104*c*. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. As further used herein, a "serving" access point is one with which a terminal, has uplink traffic (data) transmissions, and a "neighbor" (non-serving) access point is one with which a terminal can have downlink traffic and/or both downlink and uplink control transmissions but no uplink traffic. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with, each other as needed. Backhaul network communication 135 can facilitate point-to-point communication between base stations employing such a distributed architecture. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different; terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2A:
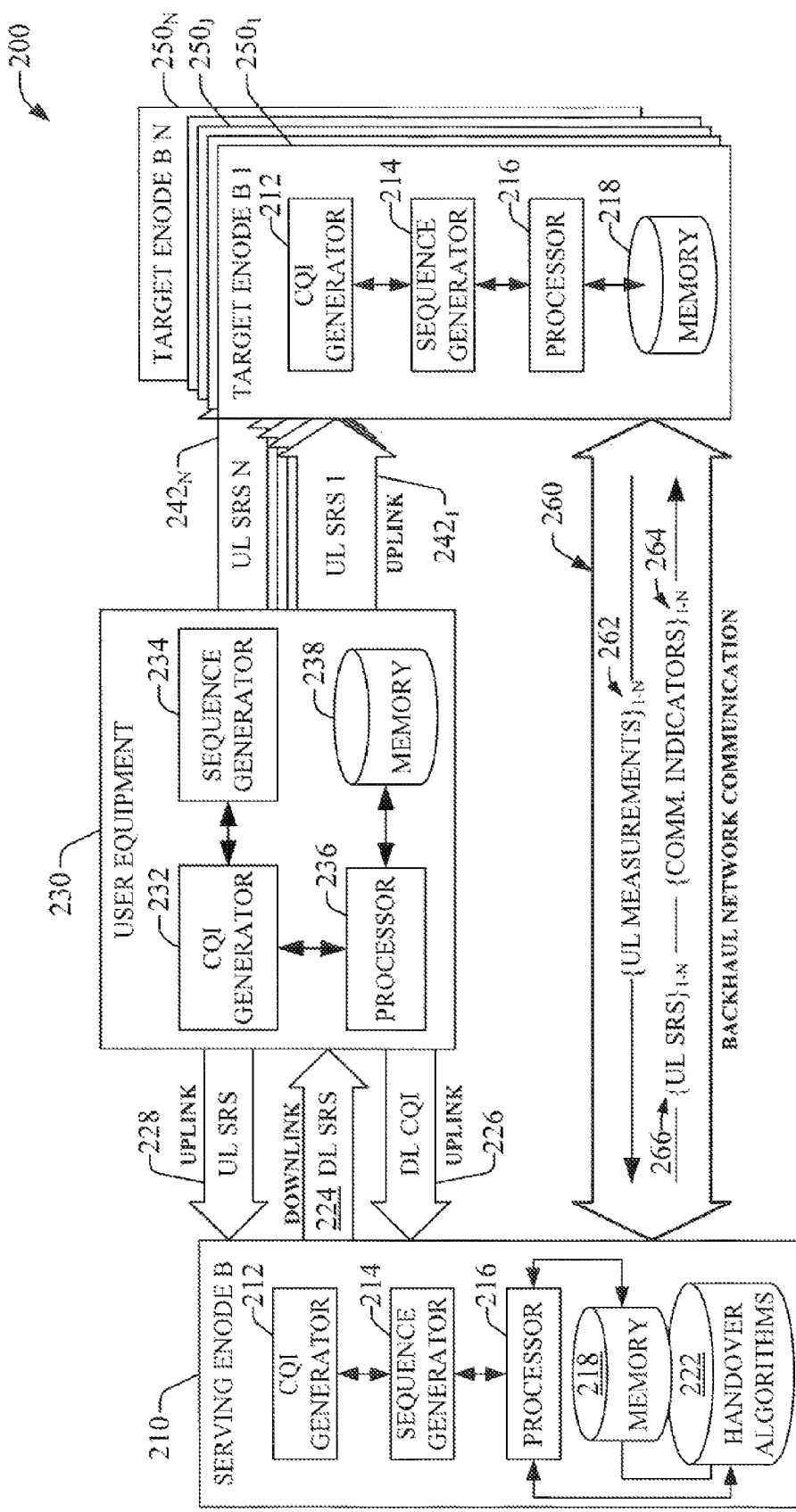
Figure 2C:
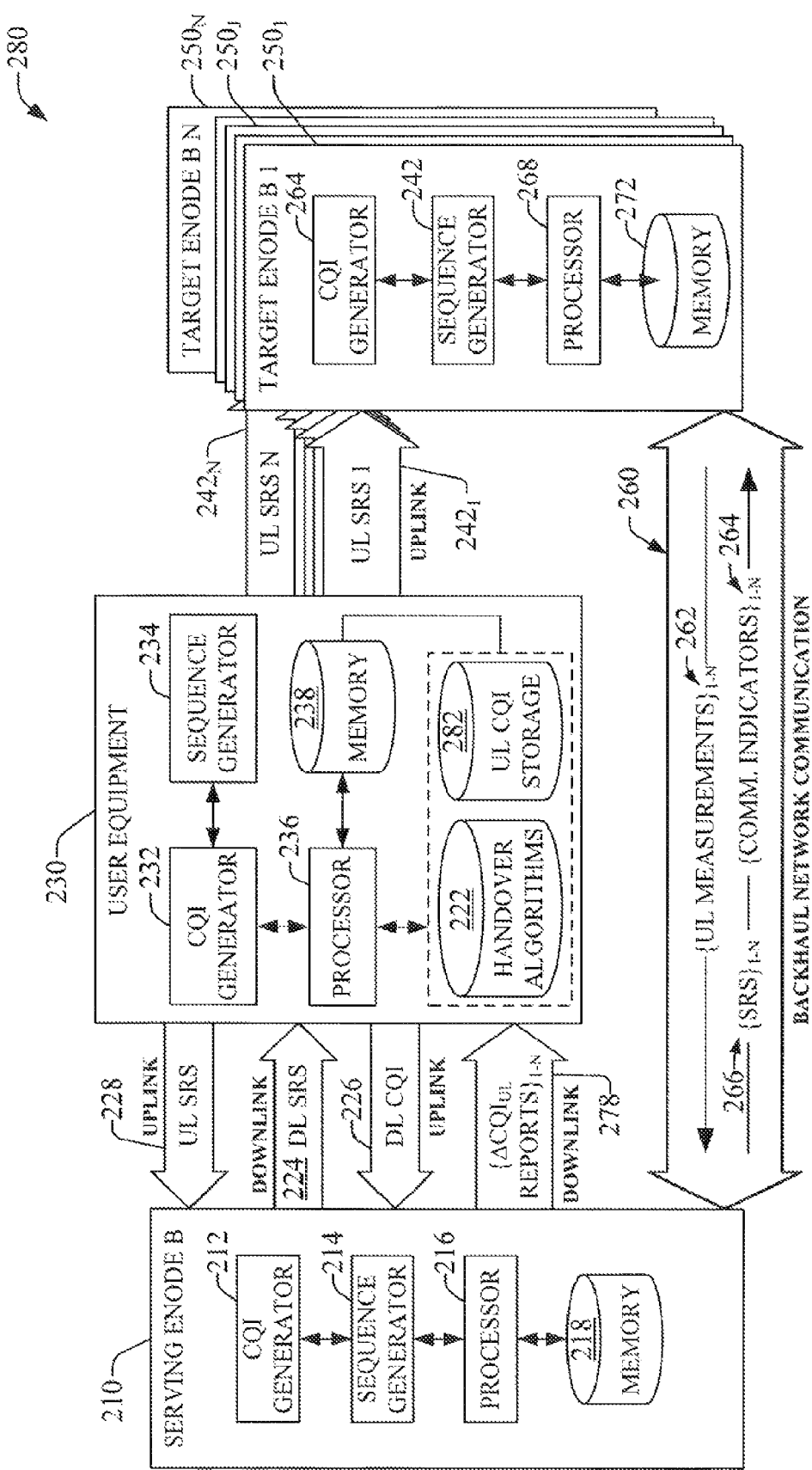

FIGS. 2A, 2B, and 2C are, respectively, a block diagram of an example system that facilitates handover based on UL and DL channel conditions according to aspects described in the subject specification; diagrams of UL and DL measurements, and communication indicators conveyed during operation of the system in FIG. 2A; and a block diagram of an example system that facilitates handover based on UL and DL channel conditions.

FIG. 2A is a block diagram 200 of an example system that facilitates forward handover of a mobile station. In system 200, a serving node 210 includes a CQI generator 212 and a sequence generator 214. Such components facilitate generation of broadband or narrowband downlink (DL) reference signals, which can be transmitted to user equipment 230 for generation of channel quality indications via CQI generator 232; DL CQI 226 is reported to serving eNode B 210. Generation of DL channel conditions can be effected periodically, the period for CQI reporting can be determined by traffic and load in a cell covered by serving eNode B 210. In addition, the period for reporting can depend on reported DL channel conditions, in order to ensure accurate DL CQI 226 is received at serving eNode B 210. In addition, DL CQI 226 generation and reporting can be event triggered, e.g., an additional wireless device enters the coverage area of eNode B 210, an access terminal in a neighboring cell transmits a burst of data substantially increasing other sector interference, a data buffer size (e.g., residing in memory 218) increases and communication resources for UE 230, or a disparate UE, needs adjustment, and so on.

In addition to receiving DL CQI 226 from UE 230, serving eNode B receives an UL sounding reference signal (SRS) 228, which can be a sequence transmitted in a narrowband (e.g., 1.08 MHz, like in the case of a RACH sounding signal) or a broadband. (It is to be noted that the UL SRS is generated by sequence generator 234, which operates in substantially the same manner as sequence generator 214.) The sounding signal is utilized by serving eNode B 210 to conduct UL measurements of channel conditions (e.g., signal strength, C/I ratios, and the like), which can be utilized as a reference metric in a handover algorithm, which can reside in memory 222 and can be executed by processor 216 to resolve handoff of UE 230 according to aspects discussed below. An UL channel conditions report can be stored in memory 218 if necessary. UL measurements at serving eNode B can be conducted by CQI generator 212, which operates as CQI generator 232.

In an aspect, user equipment 230 also conveys UL SRS $242_1$-$242_N$ to a set of target eNodes $250_1$-$250_N$ (N a positive integer). Each of target base station 2501-250N can utilize the received UL sounding channels to perform UL measurements and determine a report of UL channel conditions. Once UL measurements 262 are finished, the results are conveyed to serving eNode B 210. In an aspect, such communication occurs through backhaul network 260, or X2 interface in LTE. In this manner, serving eNode B 210 can access UL channel conditions, for the UL pertaining to the serving node and for the UL pertaining to the measurement set of target eNode Bs $250_1$-$250_N$. It should be appreciated that uplink channel state information and DL channel quality estimates are available to serving eNode N 210. Thus, by utilizing a handover algorithm in memory 222, serving base station 210 can resolve handoff of user equipment 230 based at least in part on both UL and DL channel quality information. It is to be noted that the latter can remediate issues like UL/DL link imbalance, and it can also account for different handover boundaries for UL and DL, particularly in cases signal in such channels propagates differently as in the case of FDD systems with a substantial disparity in operational frequencies.

In another aspect, serving base station 210 can convey {UL SRS}$_{1-N}$ 266 generated by user equipment 230, and {communication indicators}$_{1-N}$ 264 which comprise various system information. It should be appreciated that (i), providing UL SRSs via backhaul communication can reduce cell traffic, which is beneficial for QoS of disparate access terminals. In addition, in case of poor channel conditions, point-to-point communication through backhaul 260 ensures adequate reception at target cells. Moreover, conveying such system information facilitates indirect pre-synchronization, or coarse synchronization, of target eNode Bs $250_1$-$250_N$ with user equipment 230, in preparation for handoff. UL and DL measurements and communicator indicators broadcasted over the backhaul network, are presented next.

It is to be noted that processors 218 and 236 are configured to perform at least a portion of the functional actions, e.g., computations, necessary to implement the functionality of substantially any component in base station 210 and UE 230, respectively. Memories 218 and 238 can retain respective data structures, code instructions, algorithms, and the like, that can be employed by respective processors 216 and 236 when conferring base station 210 or UE 230 its functionality.

FIG. 2B depicts information that can be gathered through UL measurements 272. Such information includes: broadband or narrowband sounding reference signal (SRS) reference power indicates signal strength ($E_S$) and reveals UL path loss, or attenuation, associated with attenuation of radiation conveyed in the UL channel; broadband or narrowband SRS strength indicator, which typically conveys the effects of interference, indicating the strength of a signal relative to average background noise, e.g., $E_S/I_0$, the measured background noise includes intra-cell and inter-cell interference; broadband or narrowband SRS over thermal noise, typically conveyed as $E_S/N_0$. In addition, block 274 depicts information collected via DL measurements: RSRP and RSSI. It should be appreciated that DL RSSP and DL RSSI have conventionally been utilized by a serving bases station to resolve handover of an access terminal. It should further be appreciated that channel conditions gathered through UL and DL measurements are generally disparate. In particular, in LTE, an indication of UL RSRP (e.g., Q-offset) related to path loss is transmitted on the broadcast channel, whereas UL RSSI related to variable cell/sector interference can be conveyed among serving base stations via backhaul communication 260.

Block 276 in FIG. 2B depicts communication indicators that can be employed by a measurement set of base stations (e.g., $250_1$-$250_N$); namely, system bandwidth which, in LTE for example, can comprise multiple values ranging from 1.25 MH to 20 MHz; pilot sequences employed in broadband and narrowband sounding reference signals; CQI channel directives that determine repetition factors of CQI reports and frequency, or periodicity, of determination of channel quality indications (e.g., DL or UL measurements like those depicted in 274 and 272); cell DL timing, in particular in asynchronous systems; and UL timing offset with respect to DL communications.

FIG. 2C is a block diagram 280 of an example system that facilitates backward handover of an access terminal. System 280 possesses substantially the same functionality than system 200. In order to provide with forward handoff capabilities, in system 280, user equipment 230 receives reports of UL channel state information. In an aspect, such reports are received as a set of differential quality indicator $\{\Delta CQI_{UL}\}_{1-N}$ 275 for target eNode Bs $250_1$-$250_N$; the differential metric is relative to an uplink channel quality metric for serving base station 210; namely, $\Delta CQI^{(\lambda)} = CQI_{UL}^{(TARGET)} - CQI_{UL}^{(SERVING)}$, where $\lambda = 1, 2, \ldots, N$. In addition to receiving UL channel quality indications for target cells 2501-250N, it is to be appreciated that UE 230 can generate reports of DL channel conditions via CQI generator 232. Furthermore, user equipment 230 can resolve forward handoff by utilizing a handover algorithm that resides in memory 222, and available UL CQI in memory 278. It is to be noted that while memories 222 and 278 are illustrated as a distinct memory platform, such memories can resided within memory 238.

It is to be noted that processor 236 is configured to perform at least a portion of the functional actions, e.g., computations, necessary to implement the functionality of substantially any component in UE 230. Memory 238 can retain data structures, code instructions, algorithms, and the like, that can be employed by processor 236 when conferring UE 230 its functionality.

Figure 3:
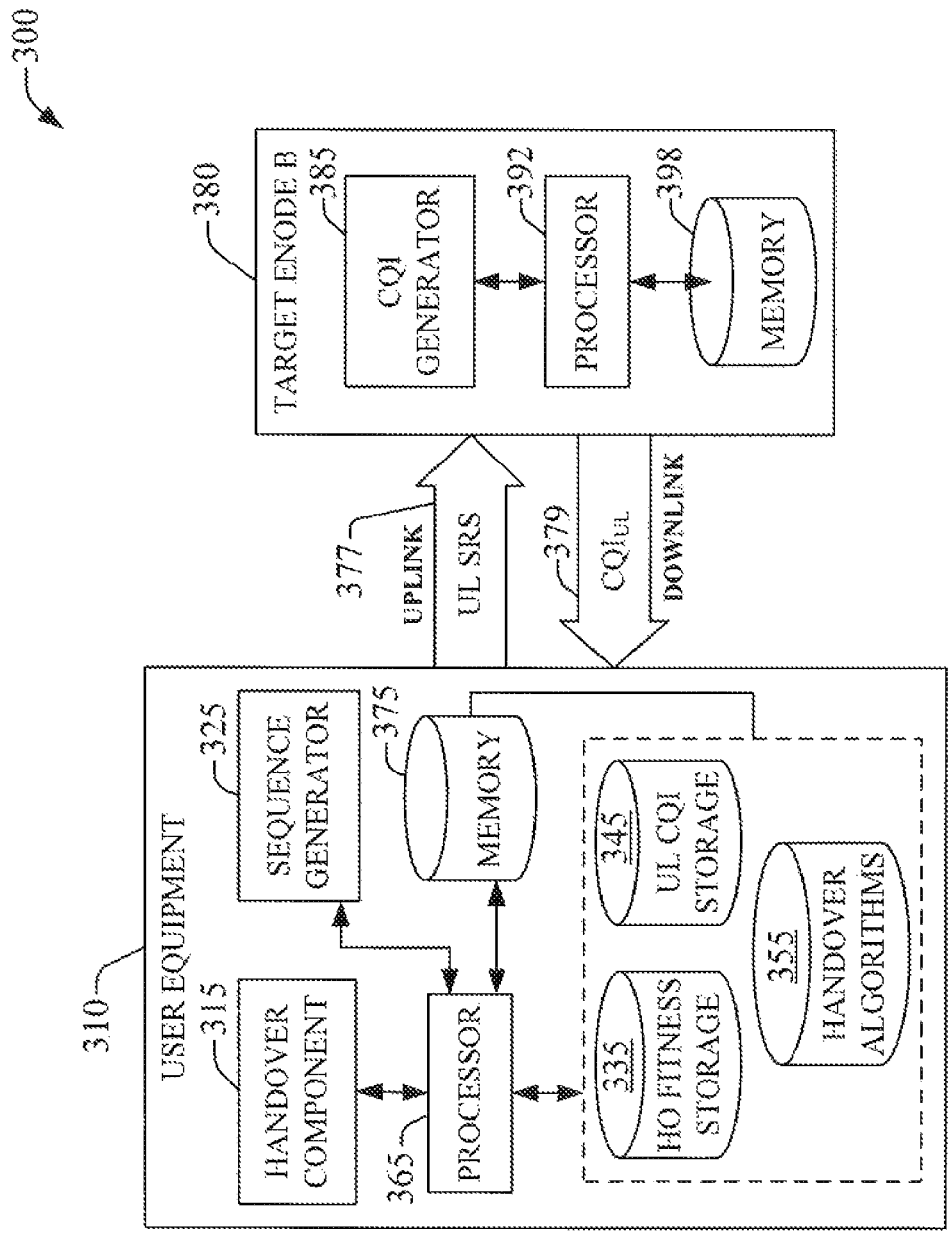
FIG. 3 is a block diagram of an example system that facilitates forward handover according to aspects described herein.

FIG. 3 is a block diagram of an example system that facilitates forward handover based at least in part on a HO method that relies on a HO fitness score associated with a target eNode B. In system 300, a user equipment comprises a handover component 315 that can resolve (e.g., grant or deny) handover to target eNode B 380. To grant or deny a handover, UE 310 generates UL sounding reference signals 377 through sequence generator 325 in substantially the same manner as discussed above in connection with sequence generator 234. In an aspect, UL SRS 377 is conveyed at a power in excess of $\Delta P$ dBm with respect to a reference signal conveyed to UE's serving signal, to ensure that UL SRS propagation covers several tier of neighboring eNode Bs (e.g., target eNode B 380). As discussed above, UL SRS can be transmitted over a narrowband channel, e.g., RACH in LTE, for a specific time span, like M sub-frames or Q slots. Furthermore, to avoid collisions, disparate UEs can transmit UL SRSs in disparate time-frequency resources—typically, collision avoidance is desired as it can mitigate the typical battery degradation associated with conveying the reference signals.

Reference signals UL SRS 377 are employed by a CQI generator 385 to estimate, e.g., through measurements, the UL channel conditions (e.g., RSRP, RSSI, or RSOT) which are reported to UE 310 in the downlink as $CQI_{UL}$ 379. To improve the channel condition estimates performed by CQI generator 385, UE 310 can repeat UL SRS up to P times; however, handover component 315 can cap the value of P to a maximum value $P_{MAX}$ that ensures an adequate trade-off amongst the advantage of receiving more accurate $CQI_{UL}$ reports and the cell/sector capacity, or throughput, and battery costs associated with increasing cell load via substantive repetition of the UL SRS sequence. In an aspect, handover component 315 can rely upon an intelligent component (not shown) to adaptively find an optimal value of $P_{MAX}$ based at least in part on changes in cell/sector interference, traffic, and load metrics. In an alternative or additional aspect, to prevent unduly loading of a narrowband or broadband channel that conveys UL SRS 377, UE 310 can rely upon a HO fitness score ($\sigma$) associated with a target eNode B 380, in a manner such that UL SRS 377 is transmitted in instances in which $\sigma > \sigma_{TH}$, wherein $\sigma_{TH}$ is score threshold. Such a score can be adapted, increasing or decreasing, according to reported UL channel conditions, e.g., $CQI_{UL}$ 379. In an aspect, handover component 315 can modify the magnitude of a stored $\sigma$ associated with a specific eNode B according to a predetermined algorithm, e.g., a function $f(\bullet)$, which can be stored in a handover algorithms memory 355 HO fitness score can be retained in HO fitness storage 335. In an aspect, the algorithm, or function, $f(\bullet)$ can depend on historic values of $\sigma$ stored in memory 335, as well as current communication conditions (traffic, interference, etc.). In addition, handover component 315 can utilize an intelligent component (not shown) to adapt the adjustment algorithm for $\sigma$.

To resolve a forward handover to a target cell (e.g., target eNode B 380), handover component can rely on CQI reports received at the UE. Once a handoff has taken place, user equipment 310 can adjust synchronization with the current service cell.

It is to be noted that processor 365 is configured to perform at least a portion of the functional actions, e.g., computations, necessary to implement the functionality of substantially any component in UE 310; e.g., handover component 315, an intelligent component residing therein, and so forth. Memory 375 can retain data structures, code instructions, algorithms, and the like, that can be employed by processor 365 when conferring UE 310 its functionality.

As employed hereinbefore, in connection with adaptation of HO fitness scores, and in other portions of tire subject description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithms, and reinforced learning—to a set of available data (information) on the system.

In particular, to the accomplishment of the various automated aspects described above and other automated aspects relevant to the subject innovation described herein, an intelligent component (not shown) can employ one of numerous methodologies for learning from data and then drawing inferences from the models so constructed, e.g., Hidden Markov Models (HMMs) and related prototypical dependency models, more general probabilistic graphical, models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

Figure 4:
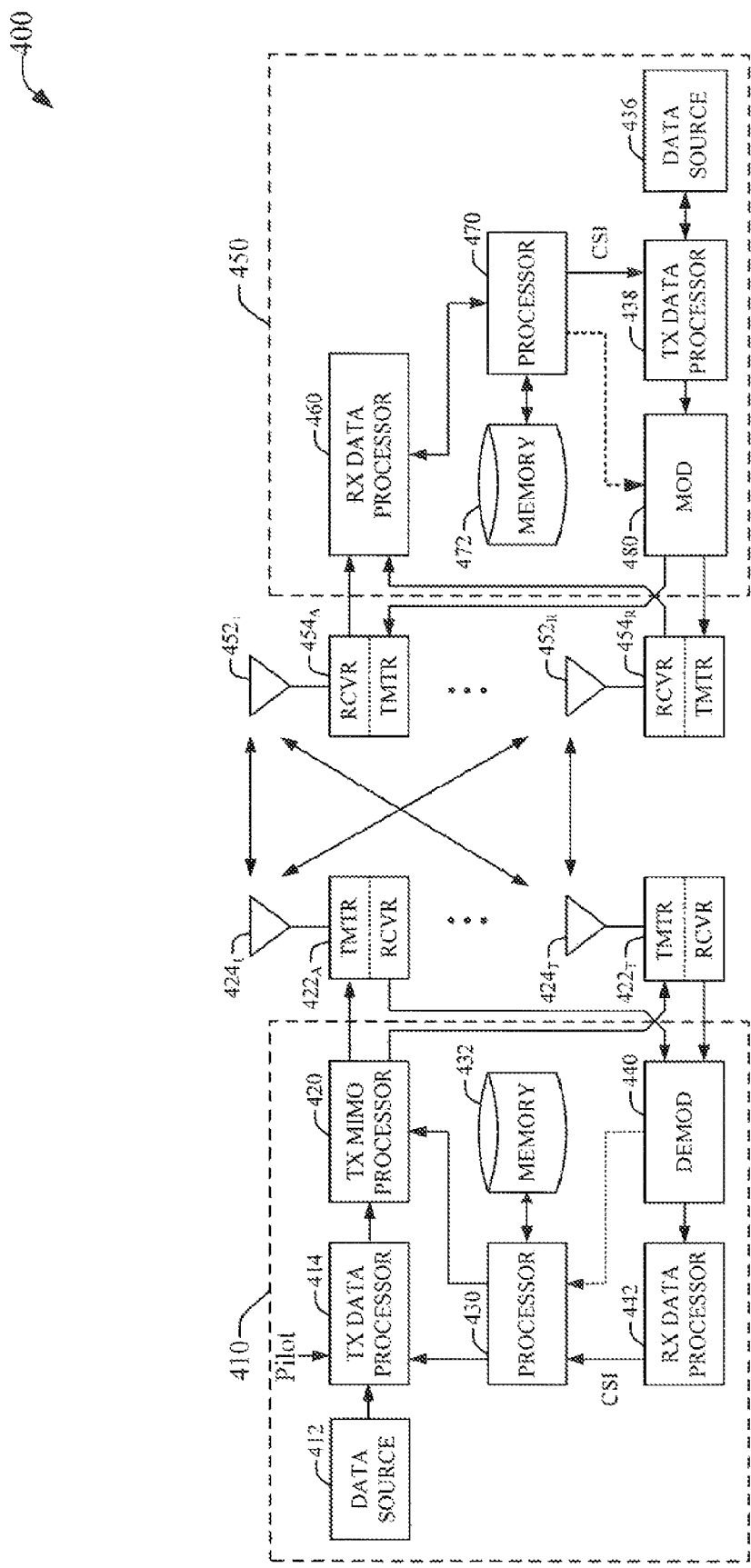
FIG. 4 is a block diagram of an example embodiment of a transmitter system and a receiver system in MIMO operation that can exploit aspects described in the subject specification.

FIG. 4 is a block diagram 400 of an embodiment of a transmitter system 410 (such as Node B 210) and a receiver system 450 (e.g., access terminal 230) in a multiple-input multiple-output (MIMO) system that can provide for cell (or sector) communication in a wireless environment in accordance with one or more aspects set forth herein. At the transmitter system 410, traffic data for a number of data streams can be provided from a data source 412 to transmit (TX) data processor 414. In an embodiment, each data stream is transmitted over a respective transmit antenna. TX data processor 414 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK). or M-ary quadrature amplitude modulation (M-QAM)) selected for that data stream to provide modulation symbols. The data rate, coding, and modulation for each data stream may be determined by instructions executed by processor 430, the instructions as well as the data may be stored in memory 432.

The modulation symbols for all data streams are then provided to a TX MIMO processor 420, which may further process the modulation symbols (e.g., OFDM). TX MIMO processor 420 then provides $N_T$ modulation symbol streams to $N_T$ transceivers (TMTR/RCVR) $422_A$ through $422_T$. In certain embodiments, TX MIMO processor 420 applies beamforming weights (or preceding) to the symbols of the data streams and to the antenna from which the symbol is being transmitted. Each transceiver 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $422_A$ through $422_T$ are then transmitted from $N_T$ antennas $424_1$ through $424_T$, respectively. At receiver system 450, the transmitted modulated signals are received by $N_R$ antennas $452_1$ through $452_R$ and the received signal from each antenna 452 is provided to a respective transceiver (RCVR/TMTR) $454_A$ through $454_R$. Each transceiver $454_1$-$454_R$ conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ transceivers $454_1$-$454_R$ based on a particular receiver processing technique to provide $N_T$ "detected" symbol streams. The RX data processor 660 then demodulates, deinterleaves, and decodes each defected symbol stream to recover the traffic data for the data stream. The processing by RX data processor 460 is complementary to that performed by TX MIMO processor 620 and TX data processor 414 at transmitter system 410. A processor 470 periodically determines which preceding matrix to use, such a matrix can be stored in memory 672. Processor 670 formulates a reverse link message comprising a matrix index portion and a rank value portion. Memory 472 may store instructions that when executed by processor 670 result in formulating the reverse link message. The reverse link message may comprise various types of information regarding the communication link or the received data stream, or a combination thereof. In particular, such information can comprise channel quality indicator report(s) (such as DL CQI 226 or {UL measurements}$_{1-N}$ 262), an offset for adjusting a scheduled resource, or sounding reference signals for link (or channel) estimation. The reverse link message is then processed by a TX data processor 438, which also receives traffic data for a number of data streams from a data source 436, modulated by a modulator 480, conditioned by transceiver $454_A$ through $454_R$, and transmitted back to transmitter system 410.

At transmitter system 410, the modulated signals from receiver system 450 are received by antennas $424_1$-$624_T$, conditioned by transceivers $422_A$-$422_T$, demodulated by a demodulator 440, and processed by a RX data processor 442 to extract the reserve link message transmitted by the receiver system 450. Processor 430 then determines which pre-coding matrix to use for determining the beamforming weights and processes the extracted message.

A mobile station 230 can be scheduled to operate in SIMO, SU-MIMO, and MU-MIMO, depending at least in part on the channel quality indicators reported by said receiver. Next, communication in these modes of operation is described. It is noted that in SIMO mode a single antenna at the receiver ($N_R$=1) is employed for communication; therefore, SIMO operation can be interpreted as a special case of SU-MIMO, Single-user MIMO mode of operation corresponds to the case in which a single receiver system 450 communicates with transmitter system 610, as previously illustrated FIG. 4 and according to the operation described in connection therewith.

In such a system, the $N_T$ transmitters $424_1$-$424_T$ (also known as TX antennas) and $N_R$ receivers $452_1$-$452_R$ (also known as RX antennas) form a MIMO matrix channel (e.g., Rayleigh channel, or Gaussian channel, with slow or fast fading) for wireless communication. As mentioned, above, the SU-MIMO channel is described by a $N_R \times N_T$ matrix of random complex numbers. The rank of the channel equals the algebraic rank of the $N_R \times N_T$ matrix, which in terms of space-time, or space-frequency coding, the rank equals the number $N_V \leq \min\{N_T, N_R\}$ of independent data streams (or layers) that can be sent over the SU-MIMO channel without inflicting inter-stream, interference.

In one aspect, in SU-MIMO mode, transmitted/received symbols with OFDM, at tone ω, can be modeled by:

$$y(\omega) = \underline{H}(\omega) c(\omega) + n(\omega). \qquad (2)$$

Here, y(ω) is the received data stream and is a $N_R \times 1$ vector, $\underline{H}(\omega)$ is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Preceding can convert a $N_V \times 1$ layer vector to $N_T \times 1$ precoding output vector. $N_V$ is the actual number of data streams (layers) transmitted by transmitter 410, and $N_V$ can be scheduled at the discretion of the transmitter (e.g., transmitter 410, Node B 410, or access point 210) based at least in part on channel conditions (e.g., reported CQI according to a reporting approach established by a serving access point) and the rank reported in a scheduling request by a terminal (e.g., receiver 450). It should be appreciated that c(ω) is the result of at least one multiplexing scheme, and at least one precoding (or beamforming) scheme applied by the transmitter. Additionally, c(ω) can be convoluted with a power gain matrix, which determines the amount of power transmitter 410 allocates to transmit each data stream $N_V$. It should be appreciated that such a power gain matrix can be a resource that is assigned to a terminal (e.g., access terminal 230, receiver 450, or UE 230) through a scheduler in the serving node in response, at least in part, to a reported CQI.

Figure 5:
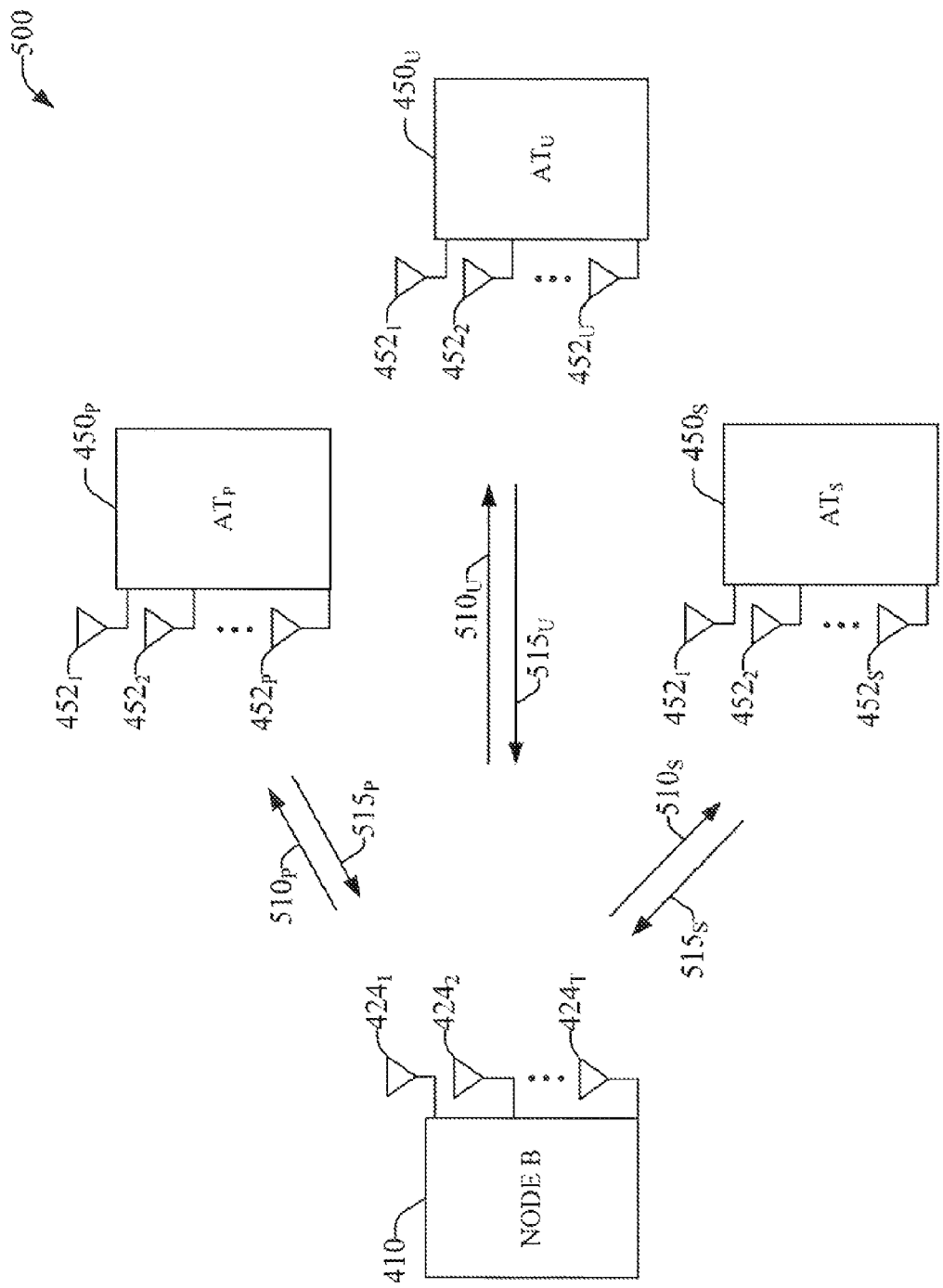
FIG. 5 is a block diagram that illustrates an example MU-MIMO system.

As mentioned above, according to an aspect MU-MIMO operation of a set of terminals is within the scope of the subject innovation. Moreover, scheduled MU-MIMO terminals operate jointly with SU-MIMO terminals and SIMO terminals. FIG. 5 illustrates an example multiple-user MIMO system 500 in which three ATs $550_P$, $550_U$, and $550_S$, embodied in receivers substantially the same as receiver 550, communicate with transmitter 510, which embodies a Node B. It should be appreciated that operation of system 500 is representative of operation of substantially any group of wireless devices scheduled in MU-MIMO operation within a service cell by a centralized scheduler residing in a serving access point. As mentioned above, transmitter 410 has $N_T$ TX antennas $424_1$-$424_T$, and each of the ATs has multiple RX antennas; namely, $AT_P$ has $N_P$ antennas $452_1$-$452_P$, $AP_U$ has $N_U$ antennas $452_1$-$452_U$, and $AP_S$ has $N_S$ antennas $452_1$-$452_S$. Communication between terminals and the access point is effected through uplinks $515_P$, $515_U$, and $515_S$. Similarly, downlinks $510_P$, $510_U$, and $510_S$ facilitate communication between Node B 410 and terminals $AT_P$, $AT_U$, and $AT_S$, respectively. Additionally, communication between each terminal and base station is implemented in substantially the same manner, through substantially the same components, as illustrated in FIG. 4 and discussed in the description thereof.

Terminals can be located in substantially different locations within the cell serviced by access point 410, therefore each user equipment $450_P$, $650_U$, and $650_S$ has its own MIMO matrix channel $\underline{h}_\alpha$ and response matrix $H_\alpha$ (α=P, U, and S), with its own rank (or, equivalently, singular value decomposition), and its own associated channel quality indicator. Due to the plurality of users present in the cell serviced by the base station 410, intra-cell interference can be present and can affect CQI values reported by each of terminals $450_P$, $450_U$, and $450_S$.

Although illustrated with three terminals in FIG. 5, it should be appreciated that a MU-MIMO system can comprise substantially any number of terminals; each of such terminals indicated below with an index k. In accordance with various aspects, each of the access terminals $450_P$, $450_U$, and $450_S$ can report CQI to Node B 410, Such terminals can report CQI from one or more antennas, utilizing a cyclic or parallel reporting approach. The frequency and the spectral characteristics, e.g., which subbands, of such reporting can be dictated by serving Node B 410. In addition. Node B 410 can dynamically re-schedule each of terminals $450_P$, $450_U$, and $450S$ in a disparate mode of operation, like SU-MIMO or SISO, and establish a disparate CQI reporting directive(s) for each of the terminals.

In one aspect, transmitted/received symbols with OFDM, at tone ω and for user k, can be modeled by:

$$y_k(\omega) = \underline{H}_k(\omega) c_k(\omega) + \underline{H}_k(\omega) \Sigma' c_m(\omega) + n_k(\omega). \qquad (2)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $\underline{H}_k$) of symbols transmitted by a transmitter (e.g., access point 210) to the other users in the cell.

Figure 8:
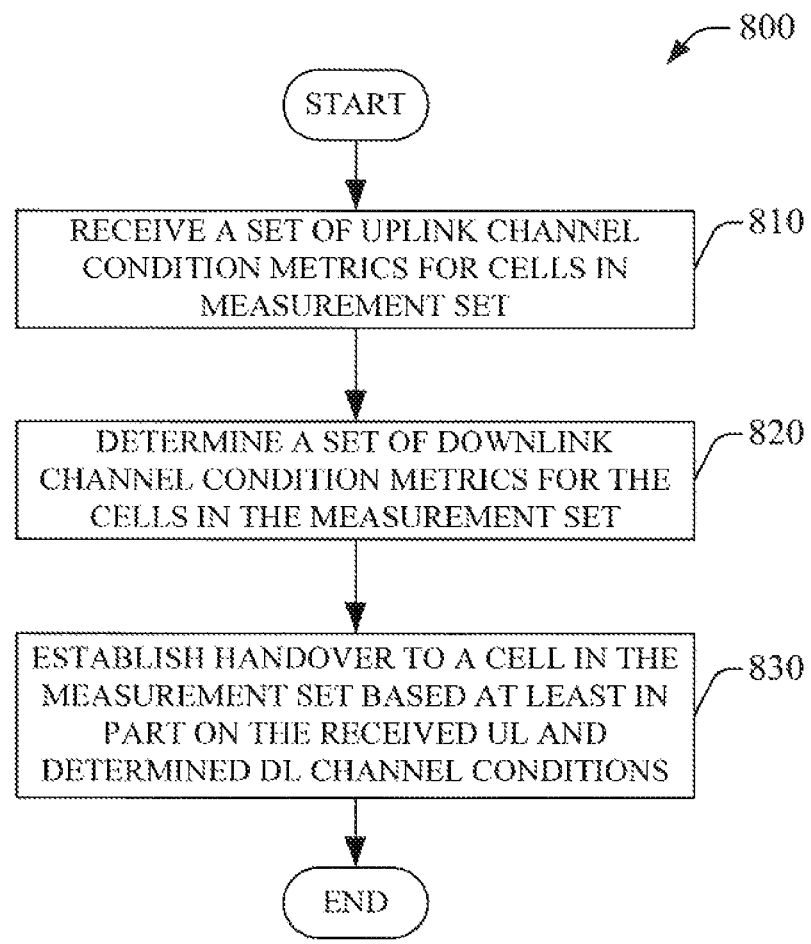
FIG. 8 presents a flowchart of an example method for establishing forward handover based at least in part on UL channel conditions in accordance with aspects disclosed herein.
Figure 9:
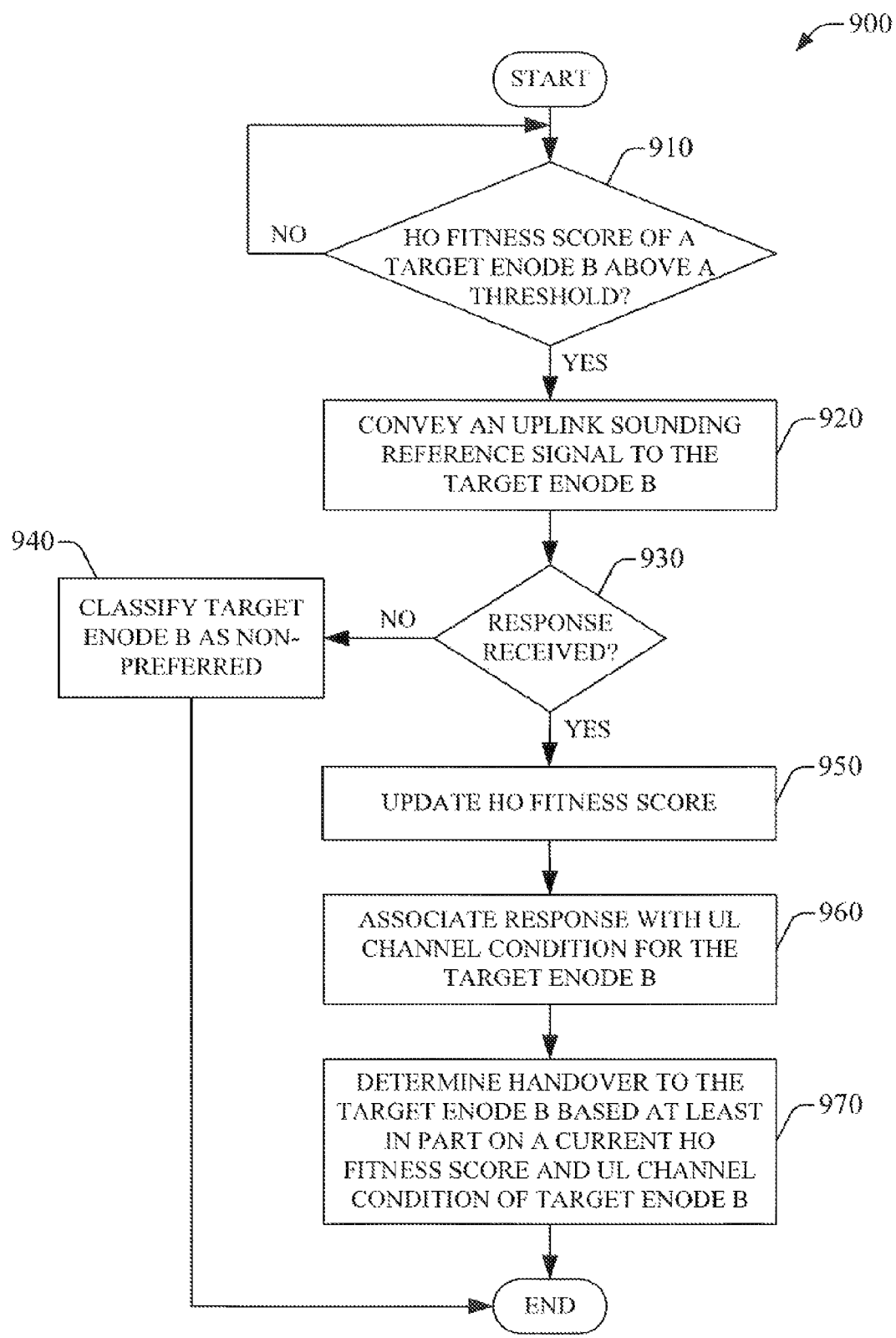
FIG. 9 presents a flowchart of an example method for determining handover (HO) based at least in part on a HO fitness score and UL channel conditions according to aspects set forth herein.
Figure 10:
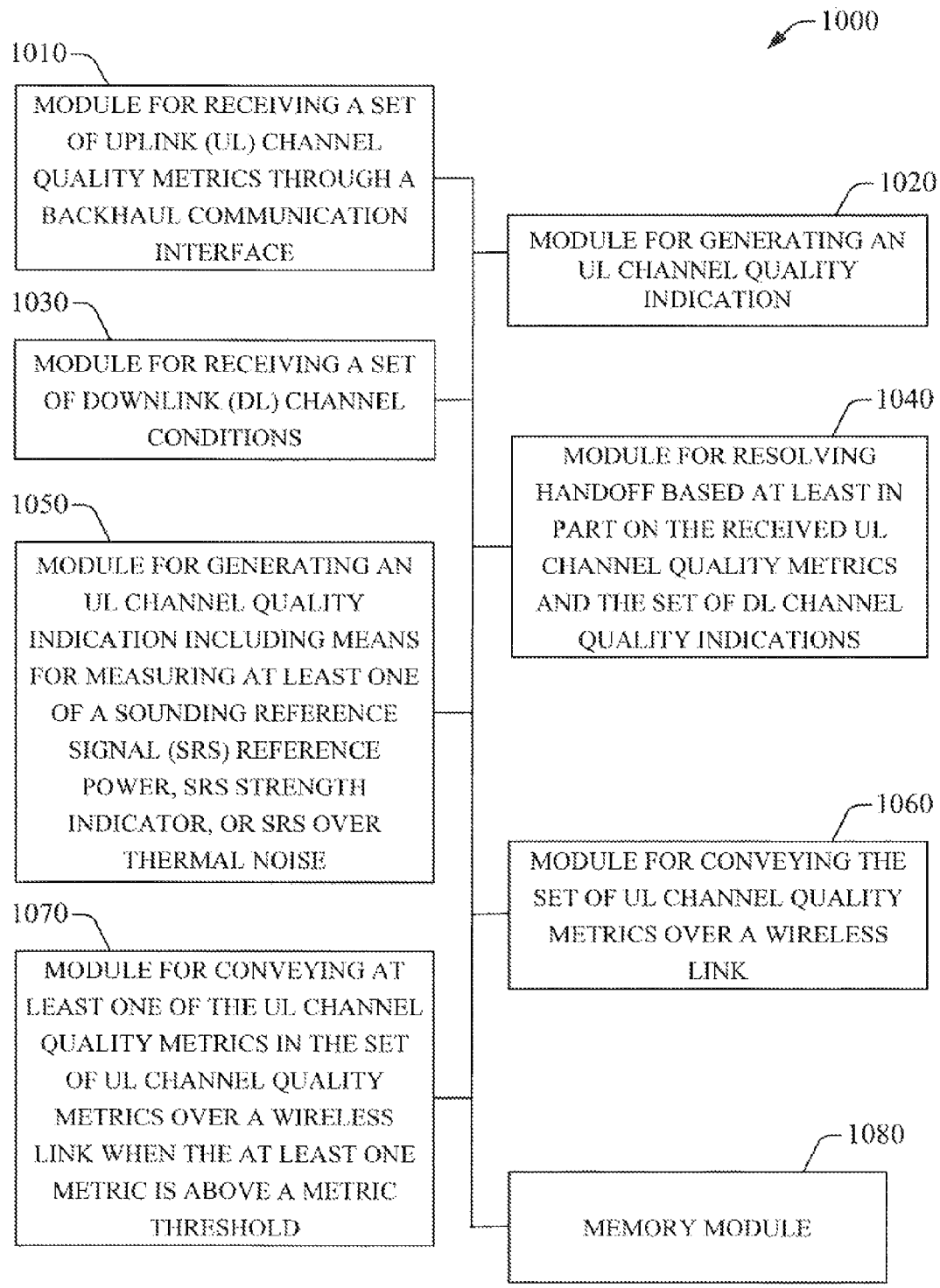
FIG. 10 illustrates a block diagram of a system that enables backward handover according to aspects described in the subject specification

In view of the example systems, and associated aspects, presented and described above, methodologies for flexible channel quality indicator reporting that may be implemented in accordance with the disclosed subject matter can be better appreciated with reference to the flowcharts of FIGS. 8, 9 and 10. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, ... ). It should be further appreciated that the methodologies disclosed hereinafter and throughout the subject specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

In view of the example systems presented and described above, methodologies for resolving handover based at least in part on uplink channel state information that may be implemented in accordance with the disclosed subject matter will be better appreciated with reference to the flowcharts of FIGS. 6-9. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
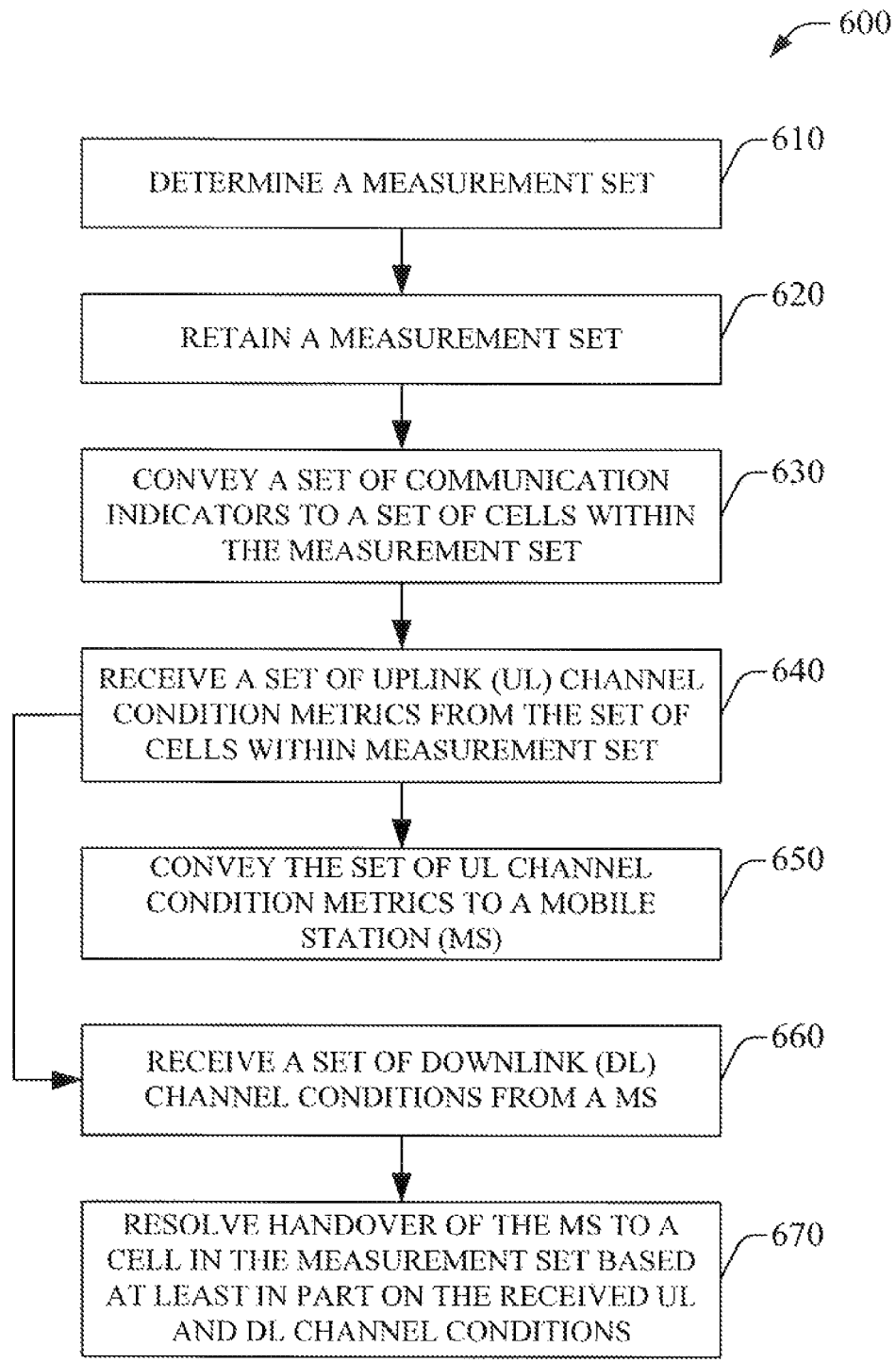
FIG. 6 presents a flowchart of an example a method for resolving handover according to aspects set forth herein.

FIG. 6 presents a flowchart of a method 600 for resolving backward handover based at least in part on UL channel conditions of a target cell. Generally, method 600 can be exploited by a base station to determine backward handover of a serviced access terminal. At 610, a measurement set is determined. Determination of a measurement can proceed via a cell/system search. Such cell acquisition can be conducted at a time a performance metric, or handover metric (e.g., an interference-to-thermal noise ratio, a signal-to-interference ratio, a signal-to-noise ratio, a signal-to-interference-and-noise ratio, and so on) for UL and DL channel reaching a predetermined threshold value. For example, the threshold value that triggers determination of a measurement set can be based at least in part on a QoS indicator, such as cell throughput, peak data rate, minimum data rate, cell/sector capacity, communication latency, and the like. Alternatively, a measurement set can be predetermined by a service provider based on the location of the user equipment. At 620, a measurement set is retained, typically in a memory associated with a serving base station.

At 630, a set of communication indicators, such as those depicted hi FIG. 2B, are conveyed to a set of cells in the measurement set. At 640, a set of UL channel condition metrics is received from the set of cells in the measurement set. In addition, such metrics can be received periodically, or it can be event triggered; e.g., a specific cell/sector load level is reached, a specific intra-cell or inter-cell interference level is detected, new system information is scheduled, and so on. In an additional aspect, the UL channel condition metrics are received through backhaul communication (e.g., X2 interface in LTE). Such communication benefits from being substantially insensitive to communication channel conditions, as the communication is point-to-point among base stations (e.g., $230_1$ and 260) via a backbone of a wired or fiber optic network. For example, T1/E1 lines or other links of the T-carrier/B carrier protocol, and/or packet-based internet protocol. The wired nature of the backhaul communication interface can ensure that UL performance are properly received and processed At 650, the set of UL channel condition metrics are conveyed to mobile station (MS). At 660, a set of downlink channel conditions is received from the mobile station. Typically, the mobile station that report DL channel conditions is the mobile station that can undergo handover. At act 670, handover of the MS is resolved based at least in part on the received UL and DL channel conditions.

Figure 7A:
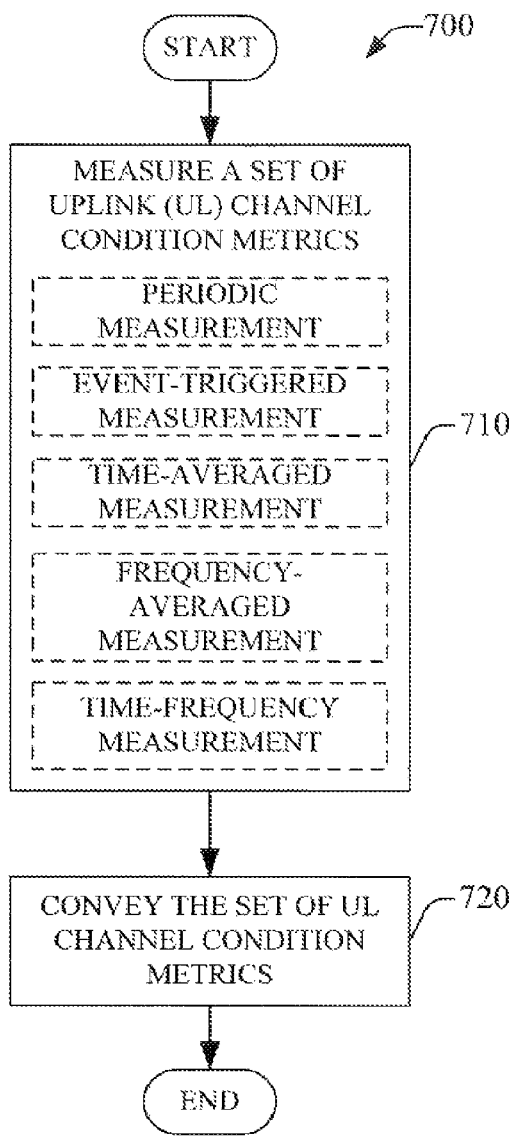
FIGS. 7A and 7B present flowcharts of example methods for collecting, respectively, UL and DL channel condition metrics.
Figure 7B:
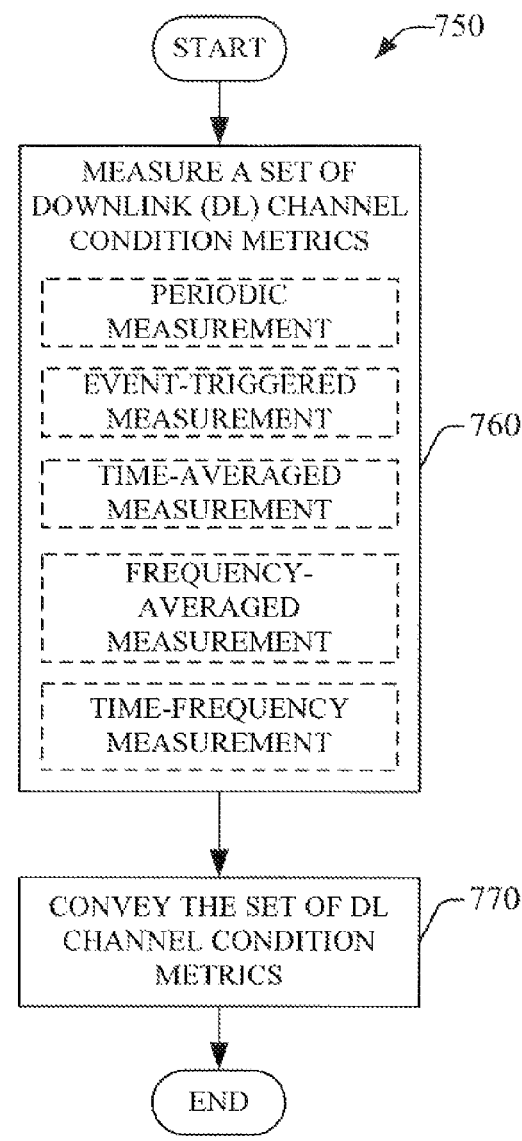

FIGS. 7A and 7B present flowcharts of example methods 700 and 750 for collecting, respectively, UL and DL channel condition metrics. At 710, a set of uplink channel condition metrics, or handover metrics, are measured. Such metrics generally comprise those depicted in FIG. 2B. In an aspect, such channel condition metrics can foe measured periodically, in a cycle comprising a specific number of slots, frames, or superframes, or it can he measured upon an occurrence of a predetermined event. In another aspect, measurements can be time-averaged, over a specific number of time resources or frequency resources (e.g., a sub-band). Moreover, UL channel condition metrics can also be determined as an average over a specific set of time-frequency resources, like resource blocks. At 720, the set of UL channel condition metrics are conveyed. Referring to FIG. 7B, acts 760 and 770 are substantially the same in scope as acts 710 and 720, but measurements are performed in the downlink.

FIG. 8 presents a flowchart of a method 800 for establishing forward handover based at least in part on UL channel conditions. At 810, a set of UL channel condition metrics, or handover metrics, for cells in a measurement set are received. At 820, a set of DL channel condition metrics are determined for cells in the measurement set. At 830, (forward) handover to a target cell in the measurement set is established based at least in part on the received UL channel conditions and determined (e.g., via method 750) DL channel conditions.

FIG. 9 presents a flowchart of an example method 900 for determining handover (HO) based at least in part on a HO fitness score and UL channel conditions. At 910, one or more validation checks are conducted to assess whether a target eNode B (e.g., $280_j$; FIG. 2) possesses a HO fitness score above a predetermined threshold. Such a fitness score is a function $f(\bullet)$ of a differential channel quality amongst the target eNode B and a serving eNode B; $\Delta CQI = CQI_{UL}^{(TARGET)} - CQI_{UL}^{(SERVING)}$. The threshold can be determined according to various criteria, such as (i) historic data on CQI of cells in a measurement set, (ii) seasonal values for CQI in a coverage area comprising the serving and target eNodeB, (iii) cell/sector load or traffic, (iv) cell interference, (v) service tier (e.g., premium user, promotional user, sporadic user, . . . ) of a user operating a mobile station that is to experience handoff and so on. Once a target eNode B that satisfy the criterion imposed in 910, an UL sounding reference signal is conveyed to the target eNodeB at 920. At 930, the presence of a response is probed, and in absence of a response, the target eNode B is classified as "non-preferred," or substantially any other label that conveys the notion that the sounded target eNode. B fails to report channel conditions: e.g., "unresponsive" can also be used. In case a response is received, a fitness score is updated according to $f(\Delta CQI)$ associated with tire target eNode B. Such an update can include increasing the HO fitness score or decreasing it. At act 960, the received response is associated with a UL channel condition for the target eNode B.

At 970, handover to the target eNode B is determined based at least in part on a current (e.g., updated) value of the HO fitness score and UL channel condition of the target eNode B. In an aspect, the determination can be conducted according to a handover algorithm associated with a service eNode B, in such a ease the handover becomes a backward handover. Alternatively, the determination at 970 can be earned out by an access terminal and she attained handover is a forward handover. It should be appreciated that performing backward handover can exacerbate latency issues, whereas conducting forward handover can result in lesser latency issue at the expense of increased user equipment complexity.

FIG. 10 illustrates a block diagram of a system 1000 that enables forward handover according to aspects described in the subject specification. System 1000 may include a module 1010 for receiving a set of uplink (UL) channel quality metrics through a backhaul communication interface; a module 1020 for generating an UL channel quality indication; a module 1030 for receiving a set of downlink (DL) channel conditions; a module 1040 for resolving handoff based at least in part on the received UL channel quality metrics and the set of DL channel quality indications; a module 1050 for generating an UL channel quality indication including means for measuring at least one of a sounding reference signal (SMS) reference power, SRS strength indicator, or SRS over thermal noise; a module 1060 for conveying the set of UL channel quality metrics over a wireless link; and a module 1070 for conveying at least one of the UL channel quality metrics in the set of UL channel quality metrics over a wireless link when the at least one metric is above a metric threshold. Modules 1010, 1020, 1030, 1040, 1050, 1060, and 1070 can be a processor or any electronic device, and may he coupled to memory module 1080.

Figure 11:
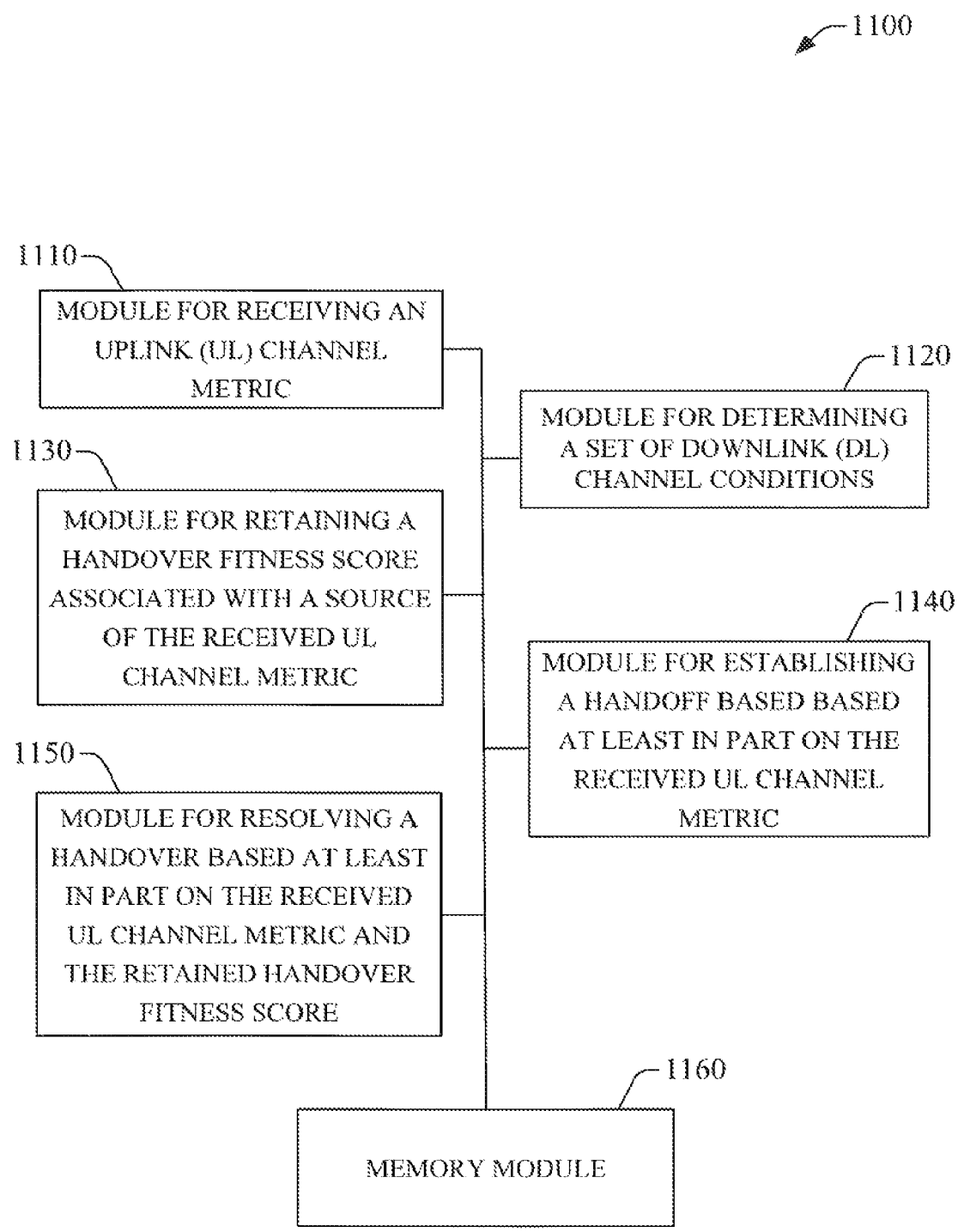
FIG. 11 illustrates a block diagram of a system that enables forward handover according to aspects described in the subject specification.

FIG. 11 illustrates a block diagram of a system 1100 that enables forward handover according to aspects described in the subject specification. System 1100 may include a module 1110 for receiving an uplink (UL) channel metric; a module 1120 for determining a set of downlink (DL) channel conditions; a module 1130 for retaining a handover fitness score associated with a source of the received UL channel metric; a module 1140 for establishing a handoff based at least in part on the received UL channel metric; and a module 1150 for resolving a handover based at least in part on the received UL channel metric and the retained handover fitness score. Modules 1110, 1120, 1130, 1140, and 1150 can be a processor or any electronic device, and may be coupled to memory module 1160.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, Stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction) and/or data.

As it employed herein, the term "processor" can refer to a classical architecture era quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the terms "includes," "including," "possess," and possessing" are used in the subject specification, such terms are intended to be inclusive in a manner similar to the term "comprising" as "comprising" is interpreted when employed as a transitional word in a claim.

What is claimed is:

1. A method for facilitating handover in a wireless system, the method comprising:

receiving at a serving base station a set of uplink (UL) channel quality metrics through a backhaul communication interface from a target base station, wherein the backhaul communication interface provides for point-to-point communication between the serving base station and the target base station;

generating a second UL channel quality metric based on a measurement of an UL sounding reference signal (SRS) indicating a path loss associated with attenuation of radiation conveyed in an UL channel when a handoff fitness score associated with the target base station is above a threshold, wherein the handover fitness score is based at least in part on a differential channel quality amongst the target base station and the serving base station;

receiving a set of downlink channel conditions; and
determining whether to grant or deny a handoff based at least in part on the set of UL channel quality metrics, the second UL channel quality metric, and the set of downlink channel conditions.

2. The method of claim 1, further comprising conveying the set of UL channel quality metrics via a wireless link.

3. The method of claim 1, further comprising conveying the second UL channel quality metric via the backhaul communication interface.

4. The method claim 3, further comprising conveying the second UL channel quality metric when the second UL channel quality metric is above a threshold.

5. The method of claim 1, further comprising conveying a set of communication indicators through the backhaul communication interface.

6. The method of claim 5, wherein the set of communication indicators includes at least one of a system bandwidth, a pilot sequence, a channel quality indicator directive, a downlink timing information, or a cell specific UL timing offset relative to a DL.

7. The method of claim 3, wherein the generating the second UL channel quality metric further includes measuring the UL SRS.

8. The method of claim 7, wherein the measuring the UL SRS includes performing a measurement periodically.

9. The method of claim 7, wherein the measuring the UL SRS includes effecting a measurement over a set of time-frequency resources.

10. The method of claim 9, wherein the measuring the UL SRS includes performing at least one of a time-averaged measurement or a frequency-averaged measurement.

11. The method of claim 7, wherein the measuring the UL SRS includes conducting an event-triggered measurement.

12. The method of claim 7, wherein the measuring the UL SRS includes at least one of measuring a SRS reference power, a SRS strength indicator or a SRS over thermal noise.

13. A wireless device, comprising:
a processor configured to:
receive at a serving base station a set of uplink (UL) channel quality metrics through a backhaul communication interface from a target base station, wherein the backhaul communication interface provides for point-to-point communication between the serving base station and the target base station;
generate a second UL channel quality metric based on a measurement of an UL sounding reference signal (SRS) indicating a path loss associated with attenuation of radiation conveyed in an UL channel when a handoff fitness score associated with the target base station is above a threshold, wherein the handover fitness score is based at least in part on a differential channel quality amongst the target base station and the serving base station;
receive a set of downlink (DL) channel conditions;
and determine whether to grant or deny handoff based at least in part on the set of UL channel quality metrics, the second UL channel quality metric, and the set of DL channel conditions; and
a memory coupled to the processor.

14. The wireless device of claim 13, wherein to generate the second UL channel quality metric includes to measure at least one of a sounding reference signal (SRS) reference power, a SRS strength indicator, or a SRS over thermal noise.

15. The wireless device of claim 14, wherein the measurement of at least one of the SRS reference power, the SRS strength indicator, or the SRS over thermal noise further includes a measurement that is conducted periodically.

16. The wireless device of claim 14, wherein the measurement of at least one of the SRS reference power, the SRS strength indicator, or the SRS over thermal noise further includes a measurement that is conducted on a set of time-frequency resources.

17. The wireless device of claim 14, wherein the measurement of at least one of the SRS reference power, the SRS strength indicator, or the SRS over thermal noise further includes at least one of a time-averaged measurement or a frequency-averaged measurement.

18. The wireless device of claim 14, wherein the measurement of at least one of the SRS reference power, the SRS strength indicator, or the SRS over thermal noise further includes an event-triggered measurement.

19. The wireless device of claim 13, the processor further configured to convey the second UL channel quality metric via a wireless link.

20. The wireless device of claim 13, the processor further configured to convey the second UL channel quality metric when the second UL channel quality metric is above a threshold.

21. The wireless device of claim 13, the processor further configured to convey a set of communication indicators through a backhaul communication interface.

22. The wireless device of claim 21, wherein the set of communication indicators includes at least one of a system bandwidth, a pilot sequence, a channel quality indicator directive, a downlink timing information, or a cell specific UL timing offset relative to a DL.

23. An apparatus that operates in a wireless environment, the apparatus comprising:
means for receiving at a serving base station a set of uplink (UL) channel quality metrics through a backhaul communication interface from a target base station, wherein the backhaul communication interface provides for point-to-point communication between the serving base station and the target base station;
means for generating a second UL channel quality metric based on a measurement of an UL sounding reference signal (SRS) indicating a path loss associated with attenuation of radiation conveyed in an UL channel when a handoff fitness score associated with the target base station is above a threshold, wherein the handover fitness score is based at least in part on a differential channel quality amongst the target base station and the serving base station;
means for receiving a set of downlink (DL) channel conditions; and
means for determining whether to grant or deny a handoff based at least in part on the received UL channel quality metrics, the second UL channel quality metric, and the set of DL channel conditions.

24. The apparatus of claim 23, wherein the means for generating the second UL channel quality metric includes means for measuring at least one of a sounding reference signal (SRS) reference power, SRS strength indicator, or SRS over thermal noise.

25. The apparatus of claim 23, further comprising means for conveying the set of UL channel quality metrics over a wireless link.

26. The apparatus of claim 25, further comprising means for conveying at least one UL channel quality metric in the set of UL channel quality metrics over the wireless link when the at least one UL channel quality metric is above a metric threshold.

27. A computer program product comprising a non-transitory computer-readable medium including:
- code for causing at least one computer to receive at a serving base station a set of uplink (UL) channel quality metrics through a backhaul communication interface from a target base station, wherein the backhaul communication interface provides for point-to-point communication between the serving base station and the target base station;
- code for causing the at least one computer to generate a second UL channel quality metric based on a measurement of an UL sounding reference signal (SRS) indicating a path loss associated with attenuation of radiation conveyed in an UL channel when a handoff fitness score associated with the target base station is above a threshold, wherein the handover fitness score is based at least in part on a differential channel quality amongst the target base station and the serving base station;
- code for causing the at least one computer to receive a set of downlink (DL) channel conditions; and
- code for causing the at least one computer to determining whether to establish a handover based at least in part on the set of UL channel quality metrics, the second UL channel quality metric, and the set of DL channel conditions.

28. The computer program product of claim 27, wherein the computer-readable medium further includes code for causing the at least one computer to convey the set of UL channel quality metrics over a wireless link.

29. The computer program product of claim 27, wherein the code for causing at least one computer to generate the second UL channel quality metric includes code for causing the at least one computer to determine at least one of a SRS reference power, a SRS strength indicator, or a SRS over thermal noise.

30. The method of claim 1, further comprising:
- transmitting from the serving base station the second UL channel quality metric via the backhaul communication interface to the target base station; and
- facilitating indirect pre-synchronization of the target base station with a user equipment based on the transmission of the second UL channel quality metric to the target base station.

31. The wireless device of claim 13, wherein the processor is further configured to:
- transmit from the serving base station the second UL channel quality metric via the backhaul communication interface to the target base station; and
- facilitate indirect pre-synchronization of the target base station with a user equipment based on the transmission of the second UL channel quality metric to the target base station.

* * * * *